United States Patent [19]

Knierim et al.

[11] Patent Number: 4,646,078
[45] Date of Patent: Feb. 24, 1987

[54] GRAPHICS DISPLAY RAPID PATTERN FILL USING UNDISPLAYED FRAME BUFFER MEMORY

[75] Inventors: David L. Knierim, Wilsonville; Harvey J. Rosener, Sherwood, both of Oreg.

[73] Assignee: Tektronix, Inc., Beaverton, Oreg.

[21] Appl. No.: 647,955

[22] Filed: Sep. 6, 1984

[51] Int. Cl.⁴ .............................................. G09G 1/14
[52] U.S. Cl. .................................... 340/750; 340/739; 340/747
[58] Field of Search ............... 340/729, 736, 739, 747, 340/750, 703

[56] References Cited

U.S. PATENT DOCUMENTS

| | | | |
|---|---|---|---|
| 3,665,410 | 5/1972 | Holland | 340/736 X |
| 3,696,391 | 10/1972 | Peronneau | 340/736 |
| 3,778,811 | 12/1973 | Gicca et al. | 340/745 X |
| 3,816,719 | 6/1974 | Trotel et al. | 340/736 X |
| 4,317,114 | 2/1982 | Walker | 340/747 X |
| 4,392,130 | 7/1983 | Lundström et al. | 340/747 |
| 4,524,353 | 6/1985 | Chase | 340/739 X |
| 4,528,642 | 7/1985 | Waller | 340/731 X |
| 4,533,911 | 8/1985 | Finegold | 340/750 X |

*Primary Examiner*—Gerald L. Brigance
*Assistant Examiner*—Vincent P. Kovalick
*Attorney, Agent, or Firm*—Allston L. Jones; Robert S. Hulse

[57] ABSTRACT

A graphics display unit providing rapid filling of predetermined areas of the display screen with one or more predefined repetitive patterns stored in the undisplayed portion of a frame buffer memory. The picture processor in executing a display list will encounter commands to load the predefined patterns(s) into the undisplayed portion of the frame buffer memory. The pattern is copied or replicated from there across the entire width of the frame buffer, with the final replication of the pattern being truncated. The display control unit fills the predetermined shapes or areas of the image to be displayed with the pattern(s) thusly loaded into the frame buffer memory, by copying sections of the scan lines of the replicated pattern up into the displayed section of the frame buffer specifically defining the shape to be filled-in. Pattern alignment between contiguous areas to be filled in with that pattern, is provided. Rapid filling is achieved by having the portion of the pattern coincide, scan line by scan line, with the image to be filled, in the X dimension. The replicated pattern becomes visible when the shape is drawn on the screen, with the shape acting as a window for viewing the pattern.

13 Claims, 7 Drawing Figures

GRAPHICS DISPLAY RAPID PATTERN FILL USING UNDISPLAYED FRAME BUFFER MEMORY

BACKGROUND AND SUMMARY OF THE INVENTION

This invention relates to graphics display units and more particularly to method and apparatus for rapidly filling predetermined areas of a graphics display screen with predefined repetitive patterns which generally are relatively small in size compared to the total area to be filled with the pattern.

The filling of such predetermined areas of a graphics display screen with one or more preselected patterns, of itself, is well known. Generally, however, existing arrangements are relatively quite slow in "painting" the patterns and require additional or special circuitry and storage capacity which add significantly to the cost of such displays. Moreover, in such arrangements replicating patterns generally involves considerable shifting, splitting, and partial word writes.

What is needed is to be able to rapidly fill the predetermined areas of the screen without the requirement for substantial additional or special circuitry and memory and electronic manipulation required of prior art arrangements. According to the present invention, this problem is solved by effectively utilizing extra scan lines of the frame buffer memory, i.e., the lines of the frame buffer memory not being displayed on the screen, to house the patterns to be utilized in filling the predetermined shapes or areas, by first replicating those patterns as necessary in the undisplayed portion of the frame buffer memory, and utilizing portions of these stored patterns which coincide in at least one dimension with the shape(s) or area(s) to be filled, wherein the latter become filled one scan line at a time. Thereby, only the height of the patterns, as opposed to the areas to be filled-in per se, is required to fit in the height of the undisplayed section of the frame buffer.

In accordance with the invention, therefore, there is provided a method for rapidly filling-in predetermined shapes or areas of a graphics display image with one or more predefined patterns, comprising:
(a) providing a frame buffer with a first section for receiving the information constituting the image to be displayed and a second section for receiving one or more patterns to be utilized in filling the predetermined shapes of the image being displayed;
(b) defining at least one replicatable pattern to be utilized to fill said predetermined shapes;
(c) entering the pattern information of said at least one pattern into said second section of the frame buffer;
(d) replicating said pattern throughout the memory locations of said second section comprising the scan lines associated to the block of memory locations into which the pattern is entered initially; and
(e) filling in one or more shapes of the image being displayed with said at least one predetermined pattern replicated in said frame buffer second section.

Also in accordance with the invention, there is provided apparatus for performing the aforementioned method which includes means for selecting a portion of the replicated pattern to fill a section of the shape to be filled such that said portion of the replicated pattern and said section of the shape coincide in at least one dimension of the frame buffer memory.

BRIEF DESCRIPTION OF THE DRAWINGS

Other advantages and features will become apparent, and the invention itself better understood, from the following detailed description, taken in conjunction with the accompanying drawings, in which.

DESCRIPTION OF THE PREFERRED EMBODIMENT(S)

Figure 1:
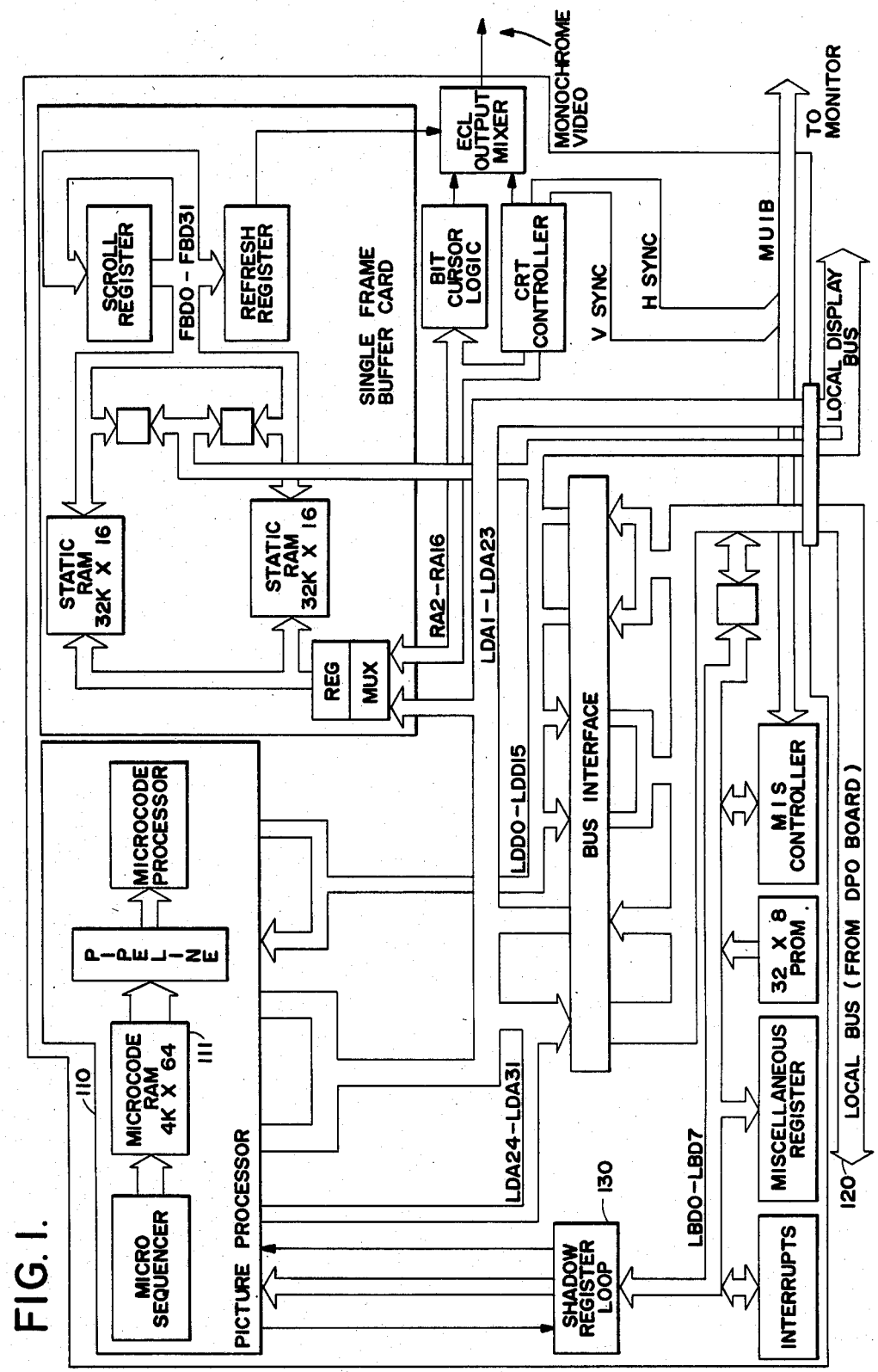
FIG. 1 is a block diagram of a graphics display's controller unit which includes the picture processor and frame buffer.
Figure 2A:
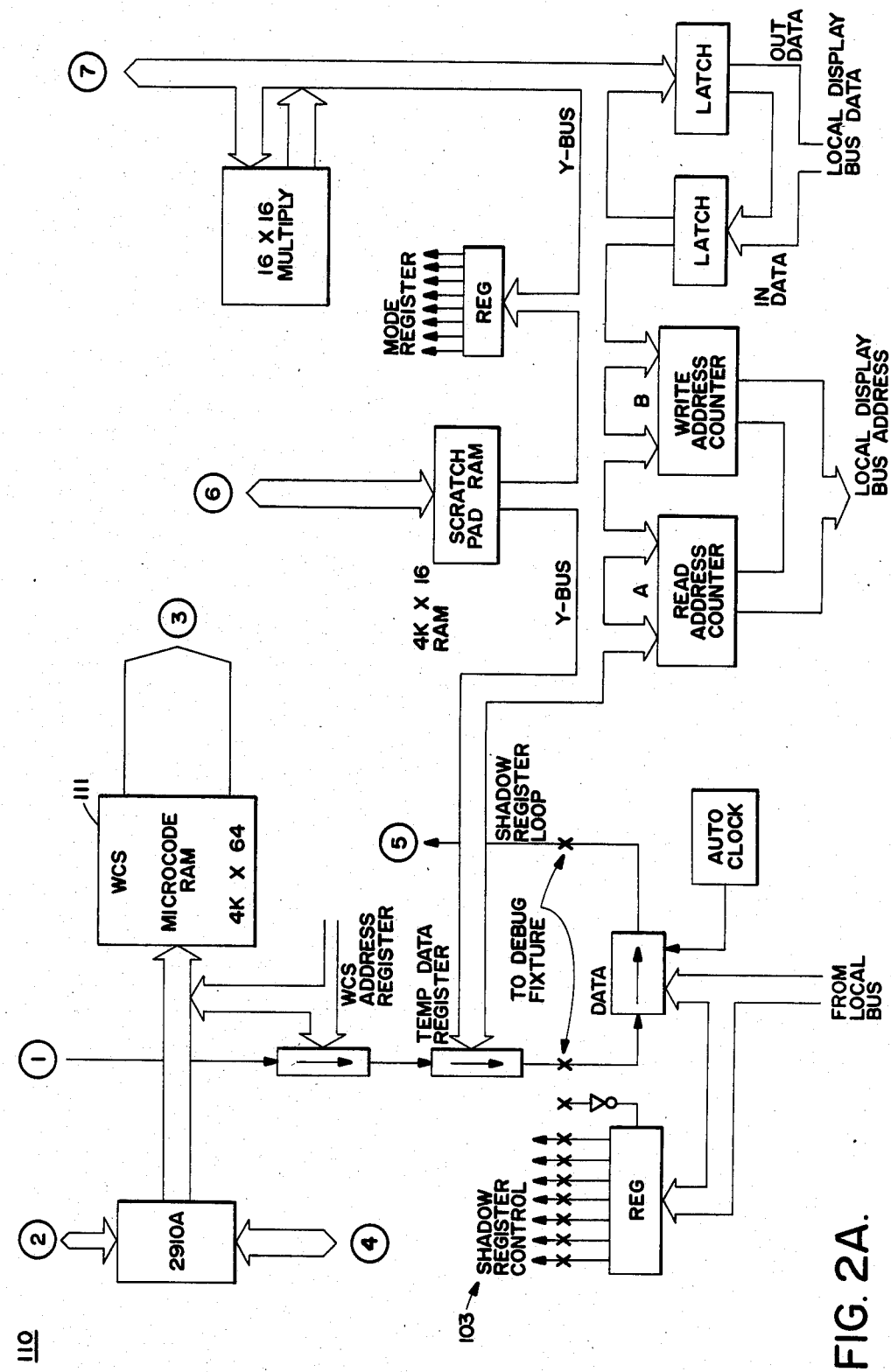
FIG. 2 is a more detailed block diagram of the picture processor portion of FIG. 1.
Figure 2B:
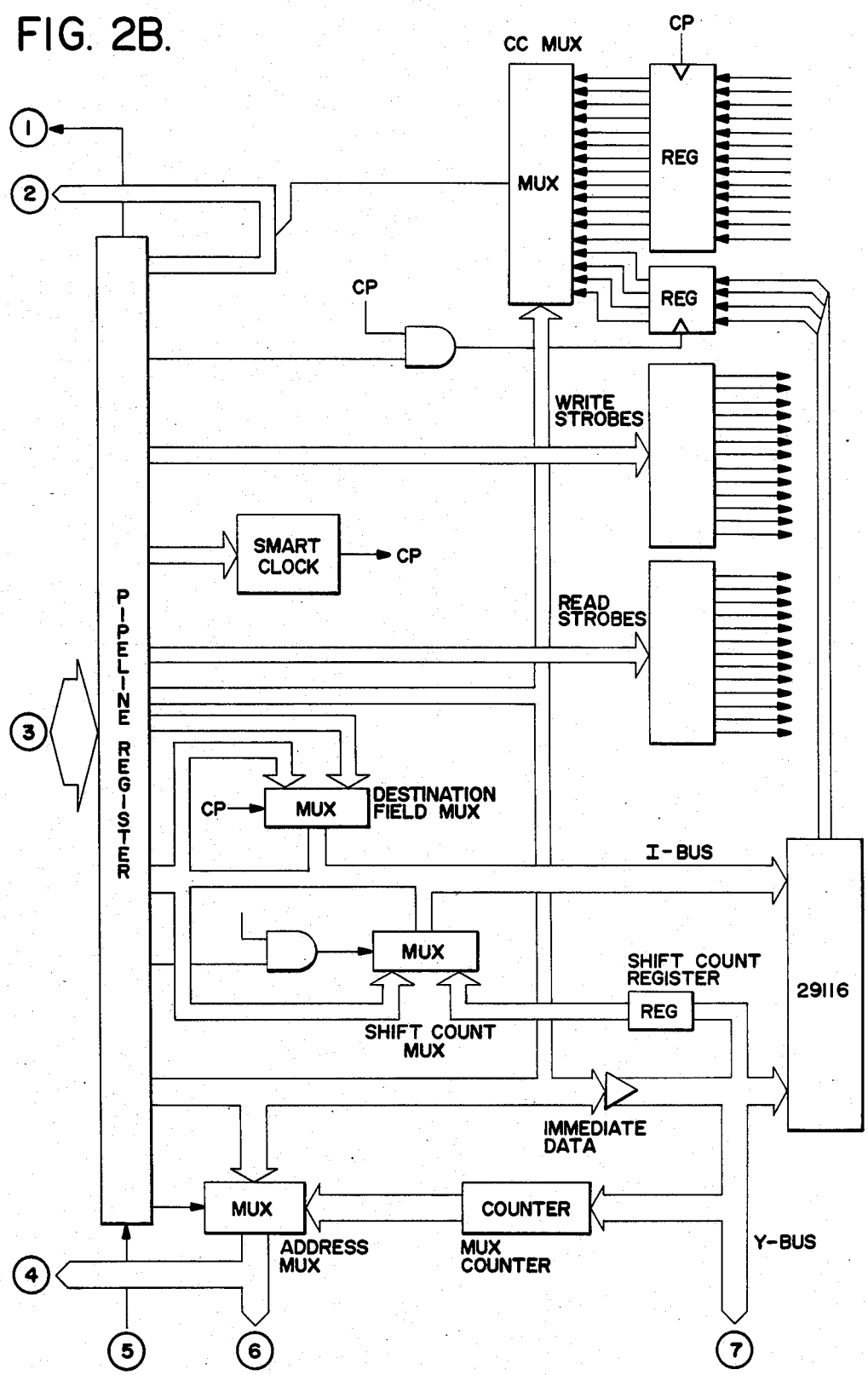
Figure 3:
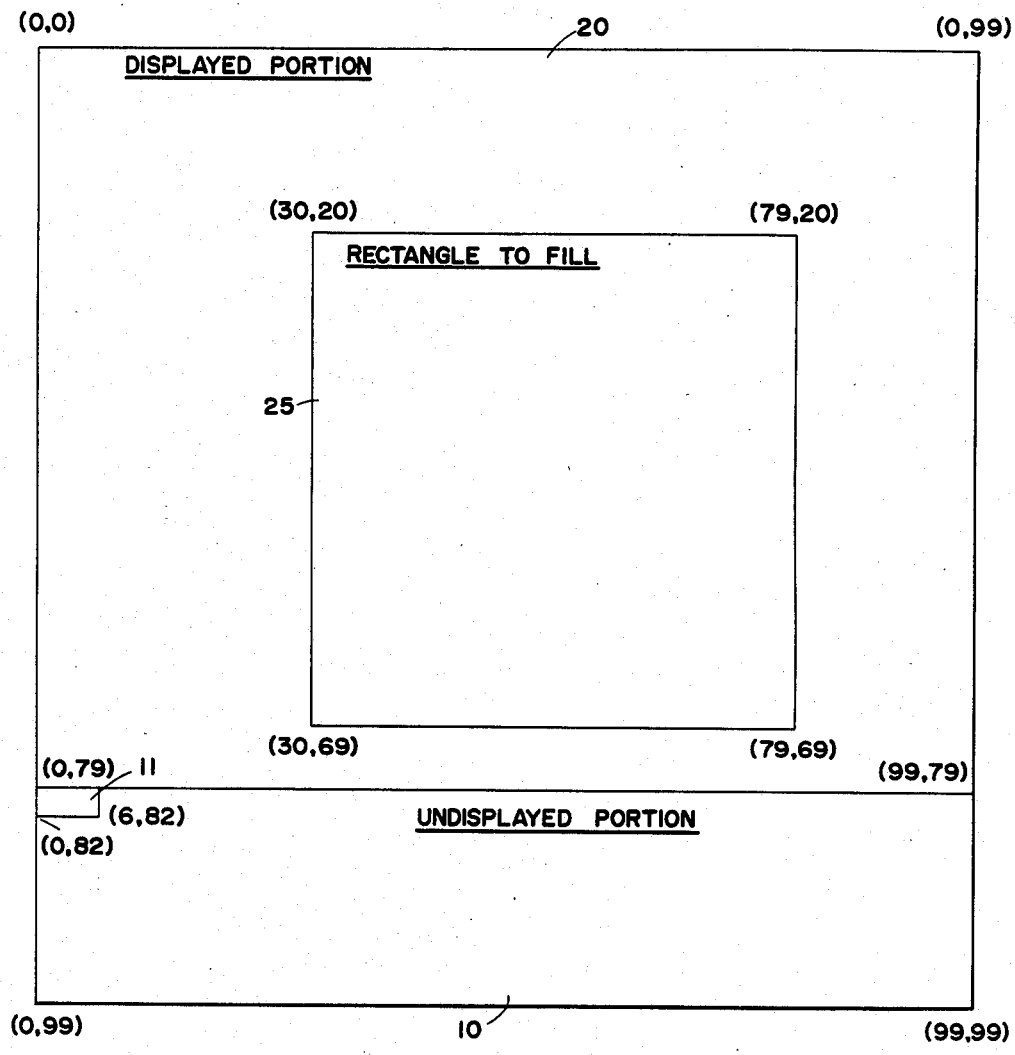
FIGS. 3-5 are schematic representations of the frame buffer memory, illustrating the displayed and undisplayed sections and their relation to the filling of a sample area of the display screen with a preselected pattern.
Figure 4:
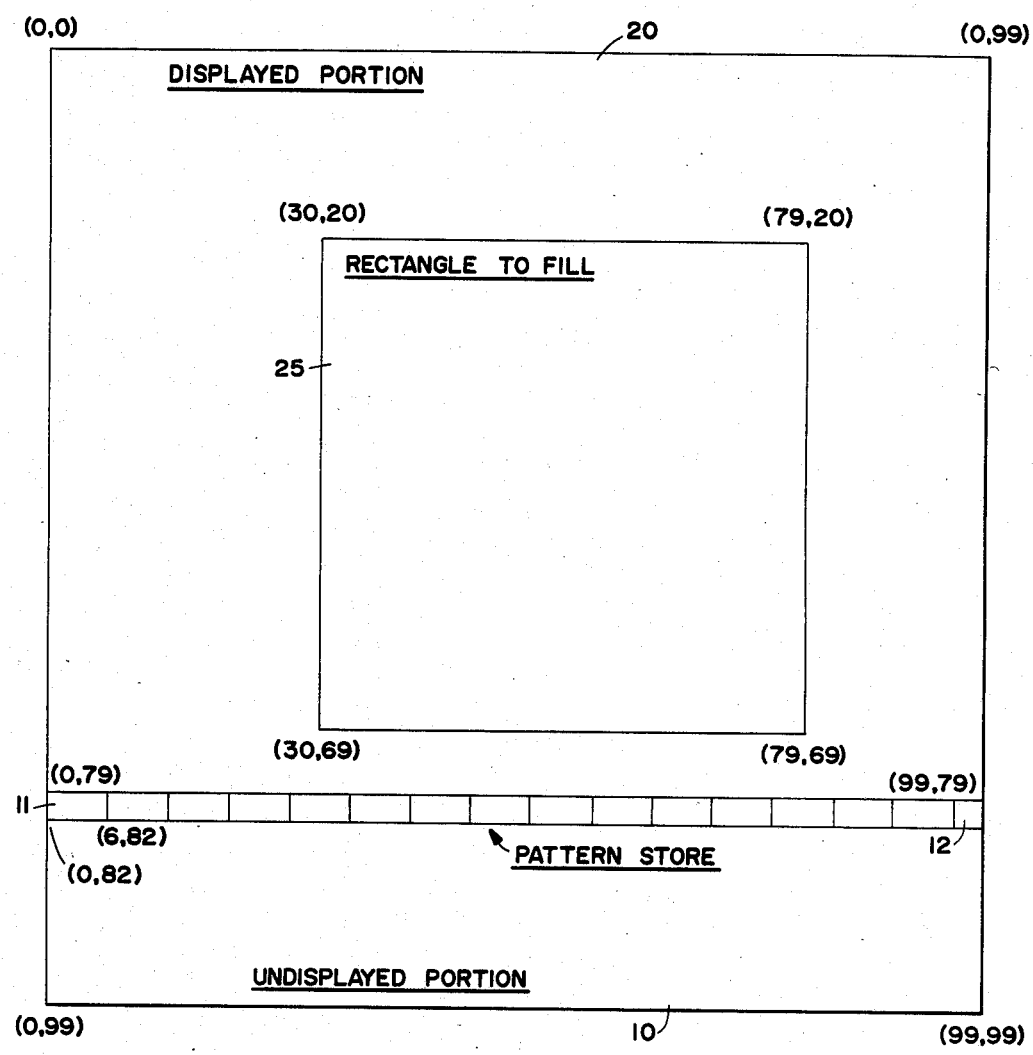
Figure 5:
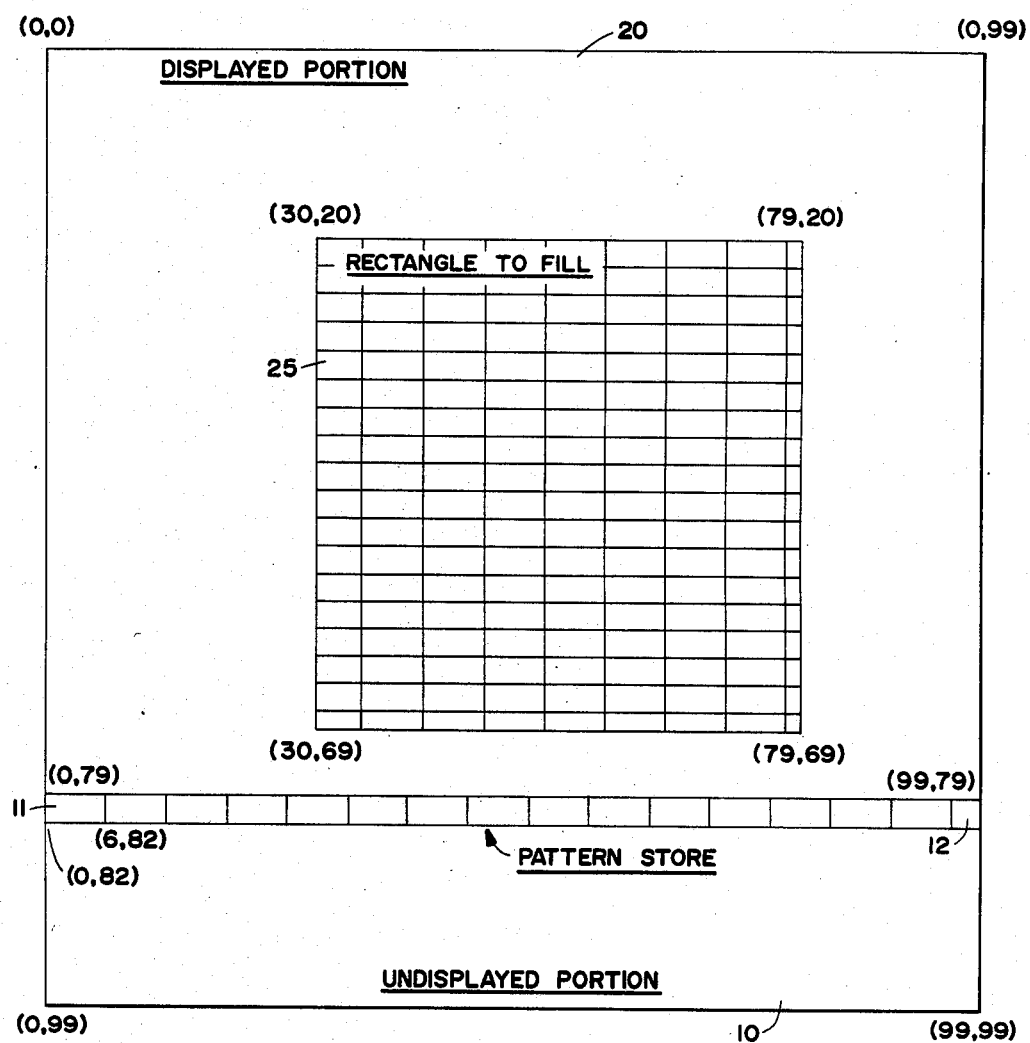

Referring to FIG. 1, which depicts a display controller unit, and FIG. 2 which depicts in detail the picture processor 110 of FIG. 1, a 100-pixel wide by 100-pixel high frame buffer is considered by way of example herein (FIGS. 3-5), wherein it is intended that the top 80 lines of the total of 100 scan lines of the frame buffer are to be displayed on a screen, i.e., the displayed portion 20 of FIGS. 3-5. A 20-pixel high by 100-pixel wide undisplayed strip at the bottom of the frame buffer 10 is thus available.

Also by way of example, a 50 by 50 pixel rectangle 25 is herein considered, as a representative shape to be filled-in by say a 7 by 3 pixel paint pattern. The geometric shape of a rectangle (or a square) is chosen for convenience in illustrating the invention. Indeed, virtually any predetermined area of desired shape may be rapidly filled via this invention. For ease of explanation, FIGS. 3-5 illustrate the upper left corner of the rectangle 25 as being positioned at point (30,20), in a left-handed coordinate system (0,0 in the upper left corner). A right-handed coordinate system could equally well be considered.

According to the invention, the sample 7 x 3 pattern is initially loaded into the frame buffer, in this example at pixel locations 0-6 in X (horizontal dimension) and 80-82 in Y (vertical dimension). This is shown as rectangle 11 in FIG. 3. The pattern is then copied from there (or reloaded from the original pattern specification) to locations 7-13, 14-20, 21-27, etc. in X, all at 80-82 in Y. The entire width of the undisplayed portion 10 of the frame buffer is thus filled in this manner, as shown in FIG. 4. The final replication of the pattern, at 12, is truncated at the right edge of the screen, using only the left-two columns of the pattern definition, in this particular example. Other patterns may, of course, be entered into the remaining (unused) area of the undisplayed portion 10 of the frame buffer.

Having completed the preparatory phrase, the display unit may now actually fill the rectangle, one scan line at a time. This is done by copying, in this example, 50-pixel wide sections of the scan lines in the replicated pattern, from the undisplayed portion of the frame buffer, up into the rectangle. If the pattern is to align between adjacent rectangles, then the 50-pixel wide section of the pattern store used should be directly "under" the rectangle, and the top scan line of the rectangle should be filled from the line at (20 mod 3)+80 =82 in the pattern store. The next scan line of the rectangle should come from (21 mod 3)+80 =80 and so on. If pattern alignment between rectangles is not required, then the copying could always start with the top scan line of the pattern store and count down, resetting to the top scan line after every use of the bottom scan line of the replicated pattern.

Where the example area being filled is a more general polygon, rather than simply a square or rectangle, the method of the invention still applies. The only change would be that each scan line of the section of the polygon may be a different width in a horizontal direction than the previous one (or even multiple sections along the same line). The proper scan line of the pattern store is copied to the appropriate section(s) of the polygon scan line, and the process repeated for the next line, just as for the rectangle.

A principle advantage of this invention is the speed of filling-in areas. Except for special cases where the width of the pattern is an integer fraction of the frame buffer word width, copying a section of one scan line to a section of another scan line at the same horizontal position is much faster than replicating the pattern across the scan line section. In the example above, the pattern was replicated across three full scan lines and then copied to 50 scan line sections, each 50 pixels wide. The alternative would have been to replicate the pattern across all 50 scan line sections.

While the 100×100 pixel frame buffer size for the within-described example was chosen for ease of illustration, typical real frame buffer sizes with undisplayed portions may be 512×512 with 512×384 or 512×480 displayed, 640×512 with 640×480 displayed, 1024×1024 with 800 to 1024×600 to 1000 displayed, and 1280×1024 with 1280×960 to 990 displayed. The word width of typical real frame buffer implementations generally varies from 16 to 80. Whereas replicating a pattern that is not an integer fraction of the word width generally involves much shifting, splitting, and partial word writes, with this invention copying from the pattern store requires no shifting and significantly fewer partial word writes, and can often be done with an entire frame buffer word per cycle.

In connection with the example of the 100×100 pixel frame buffer herein described, one can consider an implementation of that frame buffer using, as example, 20-pixel memory words. Typically, one could assign memory words 0-4 to comprise scan line No. 0 (top), 5-9 for scan line 1, etc., with words 0, 5, etc on the left, and words 4, 9, etc. on the right. The pixels within each word would be numbered from 0 on the left to 19 on the right. In this manner, the upper left pixel of the rectangle to be filled (30,20) would be pixel 10 of word 101, and the lower right pixel of the rectangle (79,69) would be No. 19 of word 348.

In discussing operation of the display control unit (DCU) depicted in FIG. 1 in connection with the filling of the 50×50 pixel example rectangle with the 7×3 pixel pattern, it is to be noted that FIG. 1 in actuality shows a 1024×1024 pixel frame buffer built from 16-pixel words, whereas for the purposes of this example, there is assumed a 100×100 frame buffer built from 20-pixel words and 20-bit data paths throughout the picture processor and busses. Moreover, although FIG. 1 depicts monochrome operation, this invention is directly applicable to color arrangements.

Figure 6:
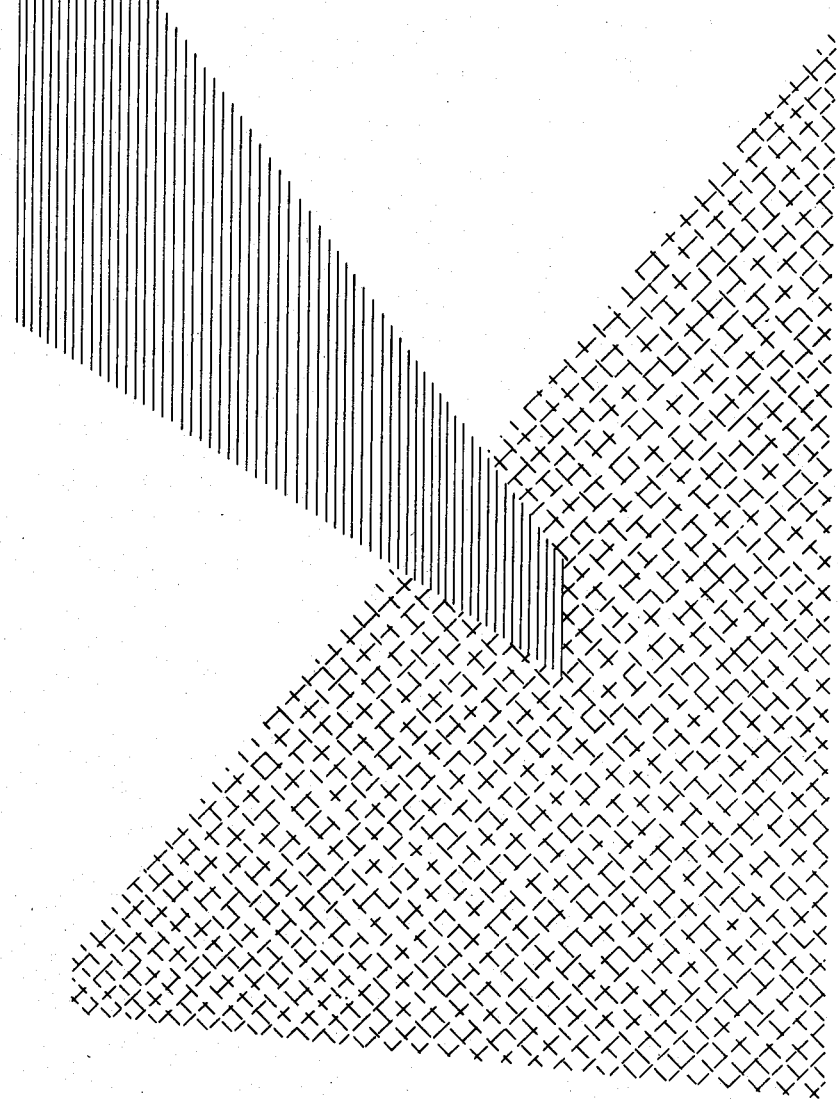
FIG. 6 is an illustration demonstrating the pattern-filling capability of this invention in connection with overlapping screen areas.

During system initialization, the microcode RAM 111 of the picture processor 110 is loaded with code capable of executing lists of commands (display lists) stored in memory in a so-called display processor unit (DPU). Although the DPU is not particularly shown in the figures, the local bus 120 connecting it with the display control unit (DCU) is shown in the lower left of FIG. 1. In this implementation, shadow register loop 130 is used for loading code. Commands in the display lists include ones to load paint patterns and ones to fill shapes (e.g. rectangles, general polygons, etc.), preferably with the most recently loaded pattern. Multiple areas filled with differing patterns can be drawn by interspersing load paint pattern commands with the fill area commands in a display list. The graphics illustrated in FIG. 6 are representative thereof.

It can be assumed, therefore, that the picture processor 110 in executing a display list, will at some point encounter a load paint pattern command with say a 7×3 pixel pattern. The picture processor (pp) 110 reads the pattern and left-justifies it into three temporary registers (each 20 pixels wide to match the frame buffer word width). These registers, though not particularly shown, may be called A1, B1, and C1. The pp copies these registers into another register set, called say A2, B2, and C2, and shifts these to the right 7 places. It logically OR's A1 into A2, B1 into B2, and C1 into C2. The shifting and OR'ing is repeated once more to complete the first three words of the pattern store. The pp writes A2 into word 400, B2 into word 405, and C2 into word 410 of the frame buffer (the left word of scan lines 80, 81, and 82). The addresses for the write operations pass over the lines labelled LDA1-LDA23 and the data over lines LDD0-LDD19 (only LDD0-LDD15 are shown in the diagram as it depicts a 16-pixel word width machine). These three words now each contain two complete copies of the pattern and a 6-pixel wide section of a third copy.

A similar set of shift and OR operations is used to form the next set of three 20-pixel words, which are written to words 401, 406, and 411 of the frame buffer. This second set of three words will contain two complete copies of the pattern with an additional one-pixel wide section on the left (to complete the 6-pixel wide section at the right of the previous three words) and a 5-pixel wide section on the right. The remaining three sets of three words are each written in a similar manner. Having completed loading of the pattern store, the pp completes the load paint pattern command by storing the height of the pattern, 3, in a word of local memory (or register) within the pp. This value is used later for the modulo and wrap around calculations.

The pp will subsequently encounter the example command of: fill rectangle between 30,20 and 79,69. Using the modulo calculation discussed previously, the pp calculates that the first pattern store scan line to be used is 82. It further calculates that the first (upper left) frame buffer word in the rectangle is 101 and that only the right 10 pixels of this word are within the rectangle. The pp reads the frame buffer words No. 101 and 411 (the word from line 82 of the pattern store directly under the word 101) into two temporary registers, say R1 and R2 respectively. It moves the right 10 pixels from R2 into R1 leaving the left ten pixels of R1 unchanged, then writes R1 back into frame buffer word 101. Next, frame buffer word 412 is read into a temporary register and immediately written to word 102, and word 413 similarly copied to word 103. A 50-pixel wide section of scan line 82 within the pattern store has now been copied into a 50-pixel section of scan line 20. The same procedure of reads and writes, except for different word addresses, is used to copy 50 pixels from scan line 80 into 21, line 81 into 22, 82 into 23, 80 into 24, ..., 80 into 69. In this way, the entire rectangle becomes filled.

More sophisticated frame buffers have the ability to write arbitrary sections of a word. In such cases moving 10 pixels from word 411 to 101 becomes a simple read and write, as would be the moves from 412 to 102 and 413 to 103 above. An even faster frame buffer can be constructed to provide for copying an arbitrary section of one scan line into the same section of another scan line as a single operation. In this case, the entire rectangle fill depicted herein would require only 50 operations. Without the present invention, filling this rectangle would require $8 \times 50 = 400$ writes of 7 or less pixels each, with shifting of the 7 pixels required on most of the writes.

The operations described in this example all have the result of copying rectangular areas of pixels from one place to another. In the case of loading the paint pattern, it is copying a $7 \times 3$ pixel rectangle from the display list memory to multiple locations in the pattern store area of the frame buffer. In filling the rectangle, it is copying $50 \times 1$ pixel rectangles from the pattern store to the rectangle. For reference on copying rectangular pixel arrays, see Ingalls, D., "The Small Talk Graphics Kernel," special issue on Small Talk, BYTE, 6(8), August 1981. It again should be noted, however, that the patterning discussed in such article is restricted to 16-pixel wide patterns, which is the width of the frame buffer employed. It is referenced for rectangular area copying only, whereas the present invention provides more general patterning capability.

As described in the BYTE article, copying can be expanded to include logical operations between the source and destination. For example, a logical OR operation between the pattern store and the rectangle to fill results in a transparent pattern. Wherever there are zeros in the pattern store, the corresponding areas of the rectangle are left unchanged. This gives the appearance of seeing through the rectangle as if it were a screen door.

There has thus been described above a graphics display rapid pattern fill arrangement in which user-defined patterns within a delta X value and a delta Y value of frame buffer memory may be replicated in X from a "seed" memory location block in the undisplayed section of the frame buffer memory, until the desired portion of that frame buffer section (which may be the entire undisplayed section) is consumed, with coordinated portions of such replicated pattern being utilized to fill-in predetermined areas of the image to be displayed. In such arrangement, the boundary of the area or shape to be filled acts as a window to view the pattern and a replicated pattern will not actually be visible until the shape to be filled is drawn on the screen.

We claim:

1. An improved method for rapidly filling-in predetermined shapes or areas of a graphics display image with one or more predefined patterns, said image and said predefined patterns each defined by user supplied information, the method comprising the steps of:
   (a) providing a frame buffer with a first section for receiving the information constituting the graphics display image for display and a second section for receiving one or more patterns to be utilized in filling the predetermined shapes of the graphics display image being displayed, said first section containing directly displayable information and said second section containing information that is not directly displayable from those frame buffer locations;
   (b) defining at least one replicative pattern to be utilized to fill said predetermined shapes.
   (c) entering the information constituting said at least one pattern into selected scan lines of said second section of the frame buffer;
   (d) replicating each of said patterns throughout the memory locations of said second section comprising the full width of the scan lines into which that pattern was entered in step c to create a repeating pattern; and
   (e) filling in one or more shapes of the graphics display image being displayed with said at least one predefined pattern replicated in said frame buffer second section.

2. A method according to claim 1 further including the step of selecting a portion of one of the repeating patterns of step d to fill a section of a shape to be filled such that said portion of the repeating pattern and said section of the shape coincide in at least one dimension of the frame buffer memory.

3. A method according to claim 2 wherein said predetermined shapes of the graphics display image being displayed are filled-in one scan line at a time.

4. A method according to claim 3 further including filling-in with the same pattern multiple sections along the same scan line of the graphics display wherein each of said multiple sections are representative of different portions of at least one of the same shapes of the graphics display image.

5. A method according to claim 2 further including aligning the selected repeating pattern between adjacent shapes to be filled with such pattern.

6. In a graphics display apparatus, an improved arrangement for filling-in predetermined shapes or areas of a graphics display image with one or more predefined patterns, said image and said predefined patterns each defined by user supplied information, said apparatus comprising:
   frame buffer means having memory means with first and second sections for receiving respectively the information constituting the graphics display image to be displayed and one or more patterns to be utilized in filling the predetermined shapes of the graphics display image being displayed, said first section containing directly displayable information and said second section containing information that is not directly displayable from those memory locations;
   means for defining at least one replicative pattern to be utilized to fill said predetermined shapes;
   means for entering the information constituting said at least one pattern into selected scan lines of the second section of the memory of the frame buffer means;
   means for replicating each of said patterns throughout those memory locations of said second section comprising the full width of the scan lines into which that pattern has been entered by the entering means to create a repeating pattern; and means for filling-in one or more shapes of the graphics display image being displayed with said at least one predefined pattern replicated in said second section of the memory of the frame buffer means.

7. An arrangement according to claim 6 wherein said filling-in means includes means for selecting a portion of one of the repeating patterns to fill a section of the shape to be filled such that said portion of the repeating pattern and said section of the shape coincide in at least one dimension of the frame buffer memory.

8. An arrangment according to claim 7 wherein said predetermined shapes of the graphics display image being displayed are filled in one scan line at a time.

9. An arrangement according to claim 8 further including means for filling-in with the same pattern multiple sections along the same scan line of the graphics display, wherein each of said multiple sections are representative of different portions of at least one of the same shapes of the graphics display image.

10. An arrangement according to claim 7 further including means for aligning the selected repeating pattern between adjacent shapes to be filled with such pattern.

11. An arrangement according to claim 6 wherein said replicating means comprises means for copying said at least one pattern from the memory location block into which said pattern is entered intitially.

12. An arrangement according to claim 11 wherein said replicating means includes means for truncating those replications of the pattern positioned proximate the end(s) of the scan lines of the frame buffer memory.

13. An arrangement according to claim 6 wherein said replicating means comprises means for loading contiguous memory location blocks with said pattern as received from said defining means.

* * * * *